Feb. 28, 1939.  C. K. GRAVLEY  2,149,216
MOTION-CONVERTING MECHANISM
Original Filed April 12, 1937  3 Sheets-Sheet 1

INVENTOR:
Charles K. Gravley
BY Ray S. Uhr
ATTORNEY

Feb. 28, 1939.   C. K. GRAVLEY   2,149,216
MOTION-CONVERTING MECHANISM
Original Filed April 12, 1937   3 Sheets-Sheet 2

INVENTOR:
Charles K. Gravley
BY Ray S. Uehr
ATTORNEY

Feb. 28, 1939. C. K. GRAVLEY 2,149,216

MOTION-CONVERTING MECHANISM

Original Filed April 12, 1937  3 Sheets-Sheet 3

INVENTOR:
Charles K. Gravley
BY Ray S. Geher
ATTORNEY

Patented Feb. 28, 1939

2,149,216

UNITED STATES PATENT OFFICE 2,149,216

MOTION-CONVERTING MECHANISM

Charles K. Gravley, Cleveland, Ohio, assignor to The Brush Development Company, Cleveland, Ohio, a corporation of Ohio Application April 12, 1937, Serial No. 136,339
Renewed July 26, 1938

4 Claims. (Cl. 74—95)

This invention relates to new and improved means for magnifying and for reducing linear motion and for converting linear motion into angular motion, and vice versa, and particularly to such motion-converting means adapted to effect a great magnification or reduction of motion.

My improved mechanism has been developed in connection with piezo-electric apparatus for coupling piezo-electric energy converters to driven or driving devices having angular motion, which in some applications may be relatively large, and for purposes of explanation and illustration I shall describe my invention as embodied in a novel form of directly-recording piezo-electric oscillograph.

Piezo-electric energy converters are in general characterized by small displacements and relatively great mechanical forces developed under the application of electromotive forces to the converter and conversely by the great mechanical forces required to generate electromotive forces and the small distances through which the mechanical forces act. In many possible applications of such energy converters it is desirable to obtain or apply smaller mechanical forces and greater motions. Simple lever systems have been found satisfactory for moderate ratios of transformation but high ratio levers in general introduce excessive loss due to their flexibility, and to play and friction in bearings, and the inertia of such levers often prohibits their use at all but very low frequencies. Other lever arrangements have been devised which have no relatively moving bearing parts and depend on the bending of some elements in lieu of pivot action, but they may introduce undesirable spring effects.

An object of this invention is to provide a mechanism for magnifying or reducing linear motion having no sliding or knife edge bearings and characterized by a minimum of lost motion.

Another object of the invention is to provide an aperiodic mechanism for magnifying or reducing linear motion.

A further object of the invention is to provide a mechanism adapted to effect large magnification or reduction of linear motion and characterized by (a) minimum inertia effects and (b) great compactness.

Another object of the invention is to provide a mechanism adapted to convert linear motion into angular motion, and vice versa, and having one or more of the following characteristics, to-wit,
(a) operation with a minimum of lost motion,
(b) aperiodic operation, (c) minimum inertia effects in operation, and (d) great structural compactness.

With the foregoing and other more or less ancillary or incidental objects in view my invention consists in certain forms and combinations of parts which are set forth in the following detailed description in connection with the accompanying drawings.

Figures 1, 13, 14:
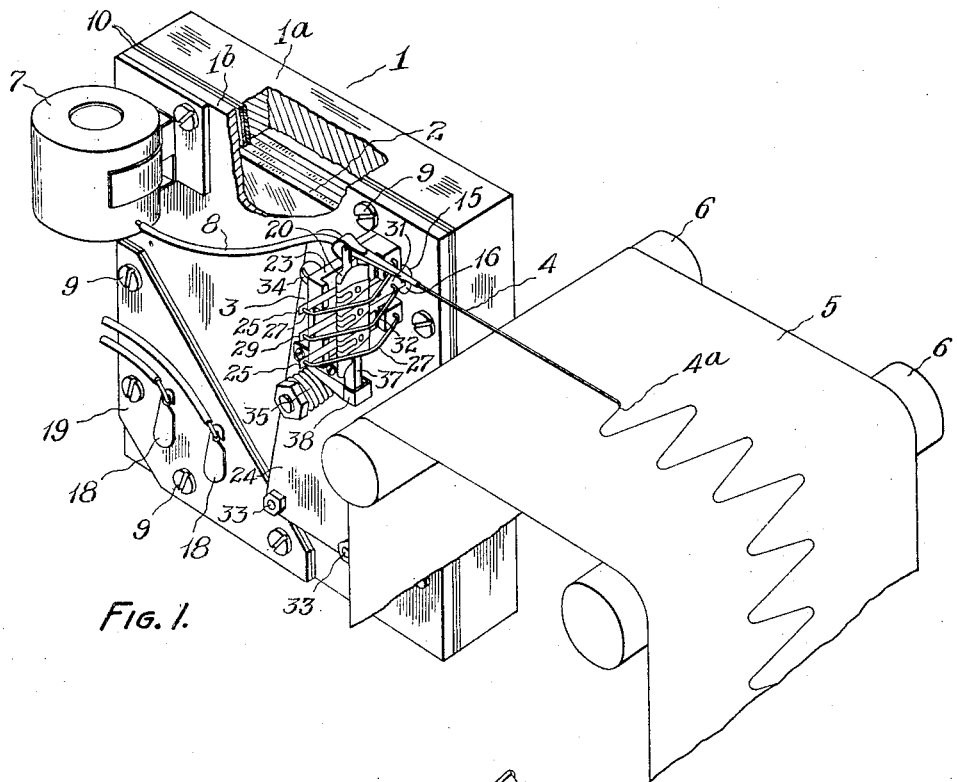
Fig. 1 is a perspective view of a piezo-electrically actuated directly recording oscillograph embodying my invention with the record paper and rolls indicated diagrammatically.
Fig. 13 is an enlarged perspective view similar to that of Fig. 11 but showing a modified form of construction.
Fig. 14 is an enlarged plan view of the spindle and pen arm parts of the device shown in Fig. 13.
Figure 2:
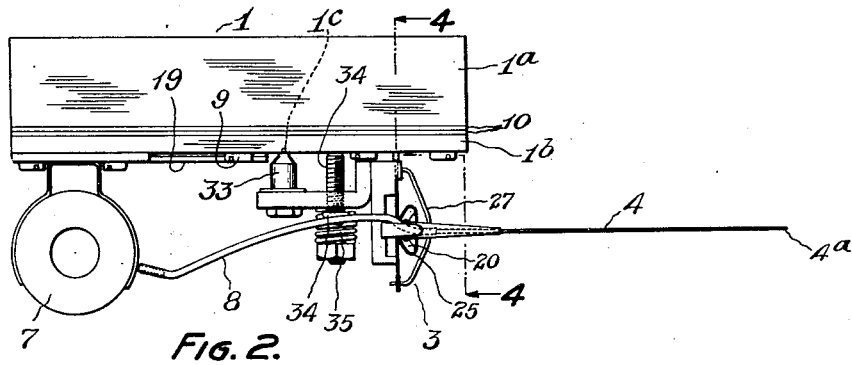
Fig. 2 is a plan view of the mechanism shown in Fig. 1 with the record paper and rolls omitted.
Figure 3:
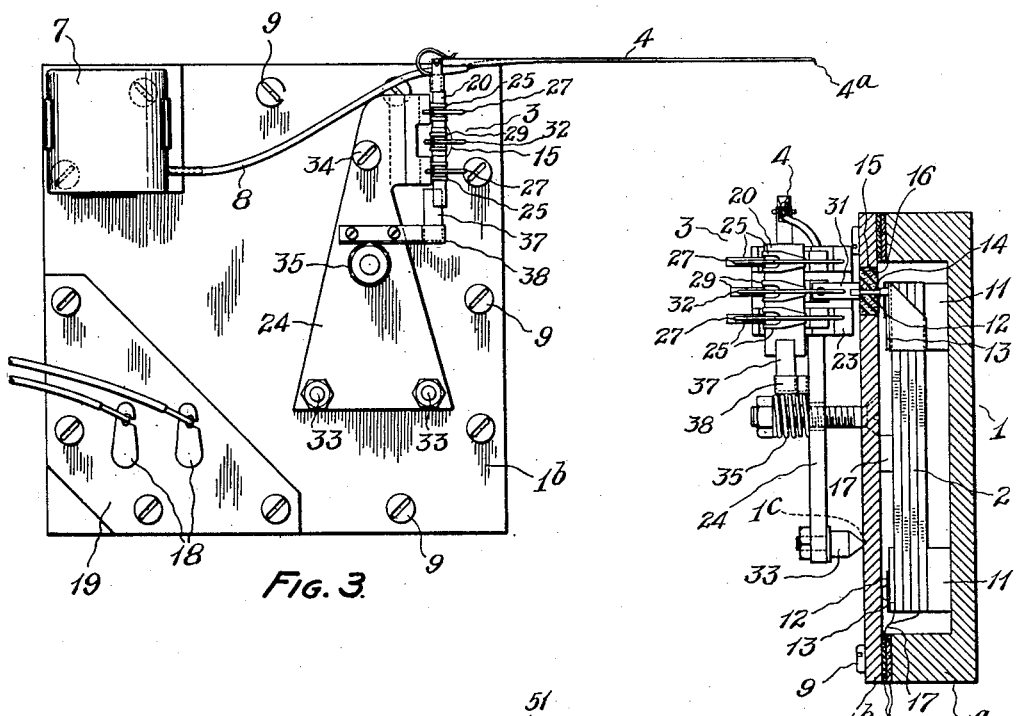
Fig. 3 is a front elevation of the mechanism shown in Fig. 2.
Figure 4:
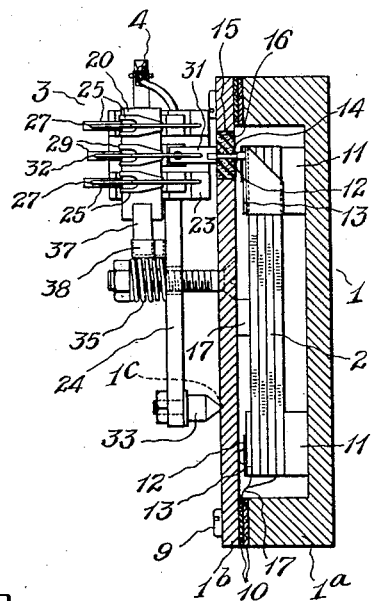
Fig. 4 is a vertical section of the same mechanism on line 4—4 of Fig. 2.

The general character of the apparatus shown in Figs. 1 to 10 may be seen from an inspection of Fig. 1. The numeral 1 designates as an entirety a box-like casing and supporting structure within which is hermetically enclosed and operatively mounted a piezo-electric unit of the flexing type designated by the numeral 2. The free portion of the piezo-electric unit is connected by a pin (not visible in Fig. 1) which is mounted for endwise movement through a wall of the casing and is operatively connected to a mechanism designated as an entirety by 3 which is mounted on the wall of the casing 1 and is adapted to convert the endwise or linear movement of the drive pin to angular movement to effect desired swinging movement of an oscillograph arm 4 connected to the mechanism 3. The arm 4 is in the form of a capillary tube fitted at its free end with a suitable capillary pen point 4a formed of glass. The pen point is arranged to contact a strip of paper 5 which is moved over rolls 6, 6 by suitably timed driving mechanism (not shown). An ink well 7 is mounted on the casing 1 and a flexible capillary rubber tube 8 connects the ink well with the inner end of the capillary arm 4 to supply the pen point with ink. When an alternating or fluctuating electromotive force is applied to the piezo-electric unit the pen point traces a graph of such alternations or fluctuations on the paper strip 5 as it moves over the rollers 6, 6.

Referring now in further detail to the construction of the apparatus, the casing 1 comprises a main body part 1a and a cover plate 1b which is attached by screws 9, 9 to the part 1a with two interposed gaskets 10, 10 of rubber or the like adapted to form a hermetic joint between the casing members.

The piezo-electric unit 2 may be of various suitable forms of construction, such, for example, as that disclosed in United States Patent 1,803,275. This plate-like unit is square in form and is mounted on the enclosing casing at three corners with the fourth corner left free for movement. The mounting means of the unit 2 at each of the three supported corners thereof comprises a block 11 of some yieldable material such as rubber which in the construction shown in interposed between the unit 2 and the body part 1a of the casing. A metal plate 12 formed with a semi-spherical or rounded boss is attached to the other side of the unit 2 opposite each block 11 with an interposed block 13 of hard insulating material and with the boss of plate 12 engaging the inner side of the cover 1b of the casing. With this construction, when the crystal unit is assembled in the casing the blocks 11 are compressed so that the crystal unit is firmly pressed against the cover plate of the casing at the three corners of the unit. In other words, the three supported corners of the unit are rigidly or fixedly held in relation to the casing, thus obviating lost motion in the mounting of the unit 2. The crystal plates or elements of the unit 2 are so oriented that the axes of expansion and contraction coincide with the diagonals of the unit on which the three points of support are arranged. This principle of mounting is fully disclosed and explained in United States Letters Patent of A. L. Williams, No. 2,105,011, granted January 11, 1938.

To the fourth or free corner of the crystal unit is secured a drive pin 14 which extends through an opening 15 in the cover plate 1b, this opening being sealed by a plug of soft rubber 16. The rubber plug surrounds and seals the drive pin 14 but is adapted to deform sufficiently to permit the necessary endwise movement of the pin. Electric leads 17, 17 of the crystal unit are brought out between gaskets 10, 10 to terminals 18, 18 which are secured to an insulating plate 19 mounted on the cover plate 1b.

The operation of such piezo-electric units is described in the above mentioned patent and application and it will be sufficient for the purpose of this application to state that a potential difference applied between terminals 18, 18 causes a displacement of the drive pin 14 in a direction normal to the face of cover plate 1b and the direction of the motion is determined by the polarity. An alternating potential difference applied between terminals 18, 18 causes a vibratory movement of drive pin 14. Conversely, mechanical displacement of drive pin 14 results in a corresponding potential difference between terminals 18, 18. The displacement of drive pin 14 on application of an E. M. F. to terminals 18, 18 actuates motion-converting mechanism 3.

Figure 7:
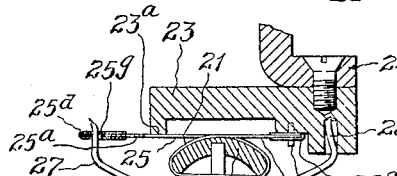
Fig. 7 is an enlarged section on the line 7—7 of Fig. 6.
Figure 10:
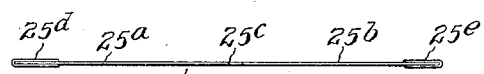
Fig. 10 is an edge view of the same.
Figure 9:
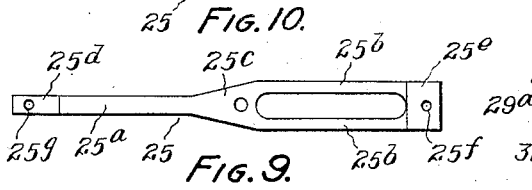
Fig. 9 is a front elevation, in unbent form, of one of three similar flexible members of the motion-converting mechanism.
Figure 8:
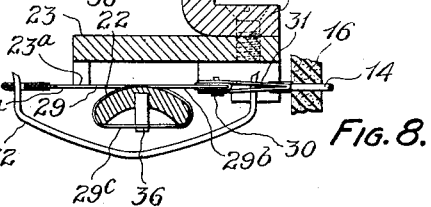
Fig. 8 is an enlarged section on the line 8—8 of Fig. 6.
Figures 11, 12:
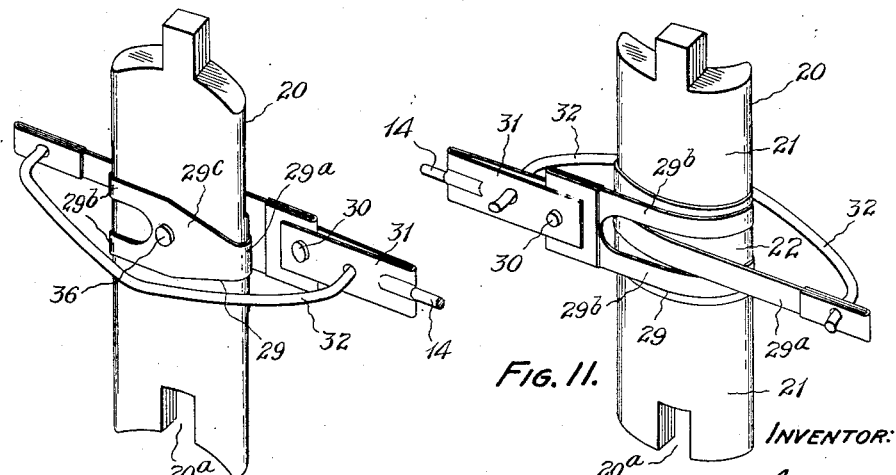
Fig. 11 is an enlarged perspective view of the spindle member of the motion-converting mechanism with one of the flexible members in operative position thereon, the parts being viewed from one side.
Fig. 12 is an enlarged perspective view of the same parts shown in Fig. 11 but viewed from the opposite side.

The motion-converting mechanism 3 comprises a spindle 20, shown in enlarged perspective in Figs. 11 and 12, having convexly curved surfaces 21, 21 of one radius and a convexly curved surface 22 of slightly different radius. The spindle is operatively supported from a block 23 carried by a plate 24 adjustably mounted on casing 1. The support of the spindle is effected by ribbon-like flexible members 25, 25 of thin spring steel or the like. As shown in Fig. 9, flexible members 25 are fork shaped and comprise end elements 25a and 25b, 25b and a connecting intermediate element portion 25c. The said end elements are provided with reinforcing tabs 25d and 25e which are soldered to their ends. The flexible members are secured to supporting block 23 by pins 26, 26 engaging holes 25f in tabs 25e, and are looped around curved surfaces 21 of the spindle in a manner similar to that indicated in Figs. 11 and 12, so that elements 25b, 25b are in contact with one curved surface portion and element 25a is in contact with another curved surface portion of the same radius. Bow-shaped springs 27, 27 engage holes 28, 28 of block 23 and holes 25g, 25g of the flexible members, and are arranged to hold the flexible members in tension and firmly against the ridge 23a of block 23. Fig. 7 (sectional view through a curved surface 21 of the spindle) shows how the spindle is supported by the block, flexible member and spring. The spindle thus supported, when it turns, also rolls on a plane defined by the straight portions of the ribbon-like members 25, 25, such rolling being permitted by the simultaneous winding and unwinding of the flexible members on different curved surface portions of the same radius.

To effect such rolling motion of the spindle it is provided with a flexible member 29 similar to members 25 and comprising end elements 29a and 29b, 29b and intermediate element 29c. As shown in Figs. 11 and 12, member 29 is looped around the curved surface 22 of the spindle and has one end secured by a pin 30 to a coupling 31 which in turn is fast on the end of the drive pin 14. A tension spring 32, similar to springs 27, holds the flexible member in tension with its straight end elements in a plane tangent to curved surface 22 and parallel to the plane defined by the straight end elements of the members 25.

When the piezo-electric unit is energized the drive pin 14 is given endwise movement and such movement, transmitted to the flexible member 29 wrapped around the surface 22 of the spindle, applies to the spindle a force tangent to the surface 22. Simultaneously, the flexible members 25 apply reactionary forces to the spindle on lines tangent to the surfaces 21, 21 and in a plane substantially parallel to and slightly separated from the plane of the driving force. The coaction of the forces thus applied to the spindle by the member 29 and the members 25 tends to rotate the spindle but since the end elements of the members 25, 25 are fixedly supported, the spindle is caused to roll on a plane defined by the straight portions of the members 25, as previously explained. This rolling motion is a combination of angular motion and lateral displacement of the spindle.

The amount of the linear motion of the flexible member 29 for a given angular motion of the spindle, or vice versa, depends on the difference between the lengths of the radii of the two curved surfaces 21 and 22 and the relation is expressed by the formula:

(1) $$\theta = \frac{x}{R-r}$$

where $\theta$ is the angle of rotation of the spindle in radians, $x$ is the linear movement of the tensioned flexible member 29, $R$ is the radius of curved surface 22 and $r$ is the radius of curved surfaces 21, 21. From this equation it will be seen that by making the difference of the radii small, a large angular motion may be obtained from a very small linear motion. Thus a slight motion of the piezo-electric energy converter 2 may be made to cause a large swinging motion of the arm 4.

As the spindle 20 rolls along the plane determined by the tensioned members 25, 25, for a given angular motion $\theta$ the axis of curvature of the cylindrical surfaces 21 moves laterally a distance $t$ expressed by the formula:

(2) $$t = r\theta$$

The relation between the distance $t$ and the movement $x$ of the drive member 14 is obtained by substituting the value of $\theta$ from Equation (1) in Equation (2) and is:

(3) $$t = \frac{r}{R-r} x$$

Thus if the pen arm were made of a length such that the pen point falls at the axis of curvature of curved surfaces 21, the point would have a straight line motion. And if $R-r$ is made small in comparison with $r$ then the motion of the pen point will be large for a small motion of the drive member. Thus the mechanism can be used as means for magnifying rectilinear motion.

If the end of the arm 4 is extended a distance $d$ beyond the axis of curvature of the cylindrical surface 21 the motion of the point at the end of the arm will be made up of two components, namely, that due to the motion $t$ of the axis of curvature of the spindle and an arcuate motion of a length $\theta d$ or $$\frac{x}{R-r} d$$

due to the angular movement of the arm about the said axis. The total travel $m$ of the pen point 4a is then:

(4) $$m = t + \theta d = x\left(\frac{r}{R-r} + \frac{d}{R-r}\right)$$

As one or the other component is made large in comparison with the other, the linear motion $x$ of the drive pin 14 may be converted to magnified forms ranging from a straight line to substantially the arc of a circle, as the exigencies of the design may require. With the spindle radii in the order of 0.50'' and a difference in radii in the order of 0.01'' and a pen arm about 3'' long, the magnification is in the order of 300 to 1 and the path of the pen point is approximately the arc of a circle.

It will be apparent from the foregoing description that I am enabled, by disposing both the supporting members 25 and the driving member 29 on one side of the spindle, to secure the effect of an exceedingly short lever arm for the purpose of attaining great multiplication of motion. The difference in the radii of the curved surfaces 21, 21 and 22 of the spindle corresponds to the length of the short arm of a simple lever and it is obvious that this dimension can be reduced to an exceedingly small value and that it is practically impossible with a simple lever mechanism to attain a lever arm comparable in shortness to this differential dimension which is so readily attained in my improved mechanism. By means of my improved construction an enormous multiplication of motion can be secured with a swinging arm of very moderate overall length and correspondingly small weight and inertia effects.

To permit the adjustment of the angular position of spindle 20 the adjustment plate 24 is provided with pointed feet 33, 33 engaging recesses 1c, 1c in cover plate 1b and with an adjusting screw 34. A spring 35 is provided to hold the adjustment plate in adjusted position. Rotation of screw 34 causes the whole spindle assembly to move toward or away from cover plate 1b, thus correspondingly rotating spindle 20. It will be observed that the flexible members 25 and 29 are held under fixed tension by their respective springs 27 and 32. The forces applied to the mechanism by the crystal unit 2 and the reaction on the support block 23 are in such direction as to increase or decrease the tension in the flexible members. By making the tension maintained in said members by their respective springs greater than the forces applied to the flexible members by the crystal unit 2, the device is made to operate with substantially no play or backlash. The motion-amplifying mechanism 3 has no sliding bearings or joints to wear and become loose and chatter. In the direction in which forces are applied thereto in operation the mechanism is very rigid and resistant and any spring action introduced by the flexible members is negligible. If desired, positive means, such as the pin 36 set in the back of the spindle and engaging a hole in the flexible member, may be provided to prevent slippage of the flexible member in relation to the spindle, but the frictional engagement between these parts is usually sufficient for this purpose.

Where the mechanism is required to operate at high speed, as for recording relatively high frequency vibrations, it is important to keep the inertia effects of the parts as low as possible and, to this end, to reduce the weight of spindle 20 and pen arm 4 to a minimum. For this reason the spindle is preferably made in the form of a section of a hollow cylinder or tube, the width of the section being made sufficient to afford the necessary curved surface for the rolling motion through the necessary angle. The spindle may to advantage be made of aluminum or other light weight metal. The capillary tube forming the pen arm is preferably made of nickel or other metal not subject to corrosion by ink.

When my motion-converting device is driven by a piezo-electric unit, an undesirable resonance effect may occur at some frequency determined by the stiffness of the crystal unit and the inertia of the spindle and the apparatus actuated by the spindle. Such resonance effect can be reduced or eliminated by mechanical damping of the movement. In the construction illustrated this is accomplished by the use of a small bar 37 of yieldable, energy-absorbing material such as the product known in the trade as viscoloid, this bar having one end inserted into the slot 20a of the spindle 20 and its other end secured to a bracket 38. Angular vibration of spindle 20 causes a twisting of the bar 37 and the latter absorbs energy from the vibrating system. When the motion-converting mechanism is used to actuate a pen, some damping is provided by the friction of the pen point on the paper, but this damping may be a variable factor due to variations in paper and other causes and it may, therefore, be desirable to provide the additional damping at the spindle.

I prefer to make the curved portion 22 of the spindle of slightly larger radius than the portions 21. However, it is feasible to make the surface 22 of smaller radius than the portions 21 and this results in reversal of the direction of angular motion of the spindle for a given direction of motion of the driving pin 14.

While I prefer to make the flexible members 25 and 29 of thin spring steel, it will be understood that other materials such, for example, as phosphor bronze, may be used. Furthermore, it is not necessary that the flexible members be made in the forms shown.

From the foregoing description the operation of the oscillograph will readily be understood. Assuming that the source of the variable electric potential to be studied is connected to the terminals 18, 18 of the device and that the record sheet 5 has been arranged in operative position on the supporting and driving rollers and that the well 7 has been supplied with ink, the variable voltage applied to the electrodes of the crystal unit causes the latter to vibrate with resultant motion of the drive pin 14 which causes the previously described rolling motion of the spindle 20 and the corresponding vibratory swinging of the pen arm 4 so that a continuous graph is traced upon the sheet of paper as the latter is moved under the pen point. Although the amplitude of the vibratory motion of the crystal unit is relatively small, the amplification of this motion by the mechanism 3 is so great and is so accurate by reason of the absence of substantially all lost motion in the mechanism, that a graph is traced by the pen upon a relatively large scale. This graph will faithfully represent the variable voltage impressed upon the piezo-electric unit if use is made of a record sheet suitably ruled to compensate for the arcuate form of motion of the pen point. Furthermore, the weight and inertia effects of the moving parts of the mechanism are sufficiently low to permit operation at sufficiently high frequencies to give the instrument a relatively large range of usefulness. One use to which the apparatus has been put is the study of mechanical vibrations of various kinds which are picked up by suitable devices adapted to convert the vibratory motion into vibratory electric currents or potentials which in turn, after suitable amplification, are impressed upon the crystal unit 2 of the apparatus. The apparatus produces a graphic record of the vibrations studied and the advantage of an apparatus capable of thus directly recording such phenomena is obvious. Another typical use of the apparatus is as a directly recording electrocardiograph, the apparatus being capable of making direct records of the suitably amplified electric currents generated by the heart or by the human body in unison with heart beats. Various other uses of the apparatus will be apparent from the characteristics of the apparatus which have been set forth.

In the foregoing discussion and in connection with the development of mathematical equations applicable to the operation of the motion-converting mechanism, it has been pointed out that in case the pen point actuated by the spindle is disposed on the axis of the spindle the graph traced by the pen point becomes a straight line. To illustrate this special case as well as certain modified details of construction I have shown in Figs. 13 and 14 a portion of a modified form of mechanism. In this construction the spindle 39 has curved surfaces 40, 40 with the same radius of curvature and a curved surface 41 of somewhat larger radius. 42 represents a drive pin to which is rigidly attached a clip 43 and flexible elements 44, 44, with their ends reenforced as in the case of the flexible members 25 and 29 previously described. Each of the flexible elements 44 has one end attached by a pin 45 to clip 43 and its other end attached to the curved surface 41 by a pin 46. A similar flexible element 47 has one end attached by a pin 48 to the opposite edge of the curved surface 41 and its other end engaged by a spring bow 49 mounted in the clip 43 and serving to maintain the flexible elements 44, 44 and 47 under tension.

Two sets of fixedly supported flexible elements similar to the elements 44 and 47 may be provided to engage the curved surfaces 40, 40 of the spindle and to afford a support upon which the spindle may roll as in the form of construction first described. These supporting flexible strips have been omitted from Figs. 13 and 14 to avoid confusion. It will readily be understood that with the spindle 39 supported in the manner indicated endwise movement of the driving pin 42 will cause a rolling movement of the spindle 39 just as in the case of the spindle 20 in the first described construction. In the present modified construction because of the larger radius of curvature of the spindle the latter is made wider to provide for a requisite rolling or angular displacement.

To the top end of the spindle is attached a pen arm 50 having a tracing point 50a and the length of the pen arm to the tracing point is made equal to the radius of curvature of the surfaces 40, 40 as shown in Fig. 14. Thus when movement of the driving pin 42 causes a rolling movement of the spindle 39 on its flexible supporting elements the tracing point 50a traces a straight line (indicated by dot-and-dash line in Fig. 14) parallel to the plane on which the spindle 39 may be considered to roll.

From a comparison of the construction shown in Figs. 13 and 14 with that shown in Figs. 1 to 12 it will be seen that the flexible elements 44, 44 and 47 correspond to and are equivalent to the end elements or portions 29b, 29b and 29a of the flexible member 29 which extend over and in contact with a portion of the curved surface of the spindle to a longitudinal element of said surface and thence on straight lines tangent to the said surface. In the first described construction the frictional engagement of the flexible members looped around the spindle (supplemented if need be by the securing pin 36) is relied upon to operatively connect the said end elements to the spindle, whereas in the construction of Fig. 13 the pins 46 and 48 perform that function. It will be obvious that the respective forms of the flexible members shown in Figs. 1-12 and Fig. 13, as well as their methods of attachment to the spindle, can be used more or less interchangeably.

Figure 15:
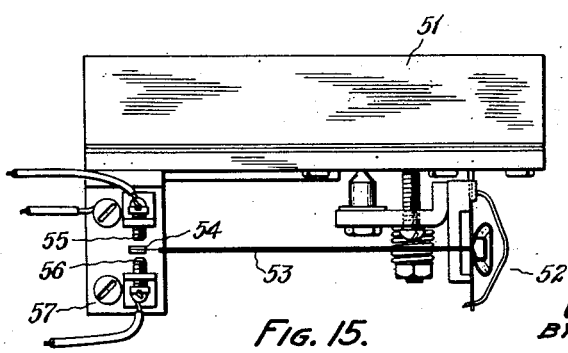
Fig. 15 is a plan view corresponding to Fig. 2 but illustrating an application of my invention to a piezo-electrically actuated relay.
Figure 5:
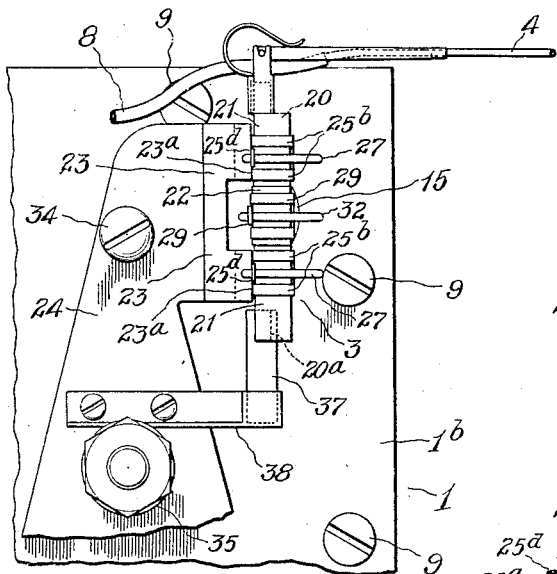
Fig. 5 is an enlarged fragmentary front elevation of the motion converting mechanism.
Figure 6:
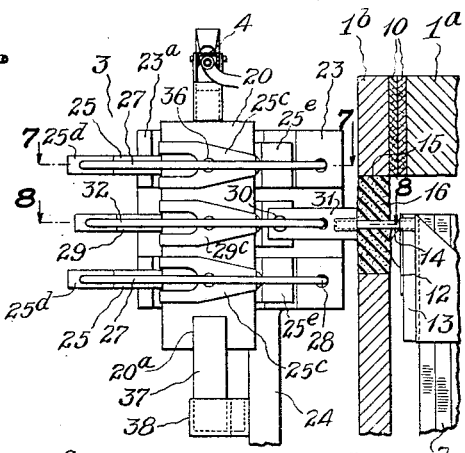
Fig. 6 is an enlarged fragmentary section on the line 4—4 of Fig. 2.

My improved motion-converting and amplifying mechanism has various other applications than the oscillographs which have been described and as a further illustration of its possible application I have shown in Fig. 15 its application to an electric relay device. Here the apparatus comprises a casing and supporting frame construction 51 containing a piezo-electric unit (not shown), a motion-converting and magnifying mechanism 52 driving a relay arm 53 which carries a contact 54 at its free end to cooperate with fixed contacts 55 and 56 adjustably mounted on a bracket 57 carried by the casing structure 51. The apparatus shown in Fig. 15 is throughout substantially similar to the corresponding parts illustrated in the other figures of the drawings, except that the contact devices are substituted for the pen point and the means for the feeding of ink are omitted.

It will be apparent that my improved motion magnifying and converting mechanism is reversible so that driving forces applied to the angularly moving arm of the spindle will convert the angular motion of such arm to linear motion of the parts 14 or 42 of the above described mechanisms, the motion of the parts 14 or 42 being in this case greatly reduced in comparison with the motion of the swinging arm. Furthermore, it will be apparent that the specific forms of arrangement and construction of parts which characterize the mechanisms illustrated can be widely varied without departing from the invention as defined in the appended claims.

What I claim is:

1. In a motion-converting device, the combination of a spindle having a plurality of convexly curved lateral surfaces of two different radii and disposed on the same side of the axis of rotation of the spindle; means for operatively supporting the spindle comprising two flexible tension elements each operatively connected at one of its ends to the spindle and operatively engaging curved surface portions of the same radius and the two elements extending in opposite circumferential directions over said surface portions to a longitudinal line defining elements of said surface portions and thence on straight lines tangent to the surface portions, and fixed supporting means for the extended ends of the tension elements adapted to maintain tension therein; two other flexible tension elements similarly connected to the spindle in operative engagement with curved spindle surface portions of the other radius and similarly disposed in relation to the spindle; a tension means attached to the extended ends of the latter flexible elements and adapted to maintain tension therein; and means to longitudinally move one of the latter flexible elements toward and the other away from their respective points of tangency with the spindle and alternately similarly to move the one element away from and the other element toward their respective points of tangency with the spindle, thereby effecting angular movement of the spindle alternately in opposite directions.

2. A motion-converting device as set forth in claim 1 having at least two curved surfaces of one radius and a corresponding number of pairs of oppositely extending flexible elements cooperating with said surfaces to operatively support the spindle.

3. A motion-converting device as set forth in claim 1 having means operatively connected to the spindle adapted to trace the movement of a point on the axis of rotation of the spindle.

4. A motion-converting device as set forth in claim 1 having motion tracing means operatively connected to the spindle and extending laterally to a distance from the line of tangency between the spindle and its flexible supporting elements which is greater than the difference between the two radii of the curved surfaces of the spindle.

CHARLES K. GRAVLEY.